Dec. 4, 1962    H. SILKEN    3,066,710
RADIAL ARM SAW TABLE
Filed July 29, 1960

*INVENTOR:*
HOWARD SILKEN
BY Peter S. Tailer
AGENT

United States Patent Office 3,066,710
Patented Dec. 4, 1962

3,066,710
RADIAL ARM SAW TABLE
Howard Silken, 309 Allen Ave., Oceanside, N.Y.
Filed July 29, 1960, Ser. No. 46,203
3 Claims. (Cl. 143—132)

This invention relates in general to radial arm saws and, more particularly, to radial arm saw tables.

An object of this invention is to provide a radial arm saw which may be more safely and accurately operated.

Another object of this invention is to provide an improvement which will enable radial arm saws to be more inexpensively manufactured.

A further object of this invention is to provide an attachment for existing radial arm saws which will enable them to be used more effectively.

Still another object of this invention is to provide more easily used rip scales on a radial arm saw.

A still further object of this invention is to provide a more accurate miter scale on a radial arm saw.

Additional objects, advantages and features of invention reside in the particular arrangement involved in the embodiment of the invention and its practice otherwise as will be understood from the following description and accompanying drawings wherein.

Figure 1:
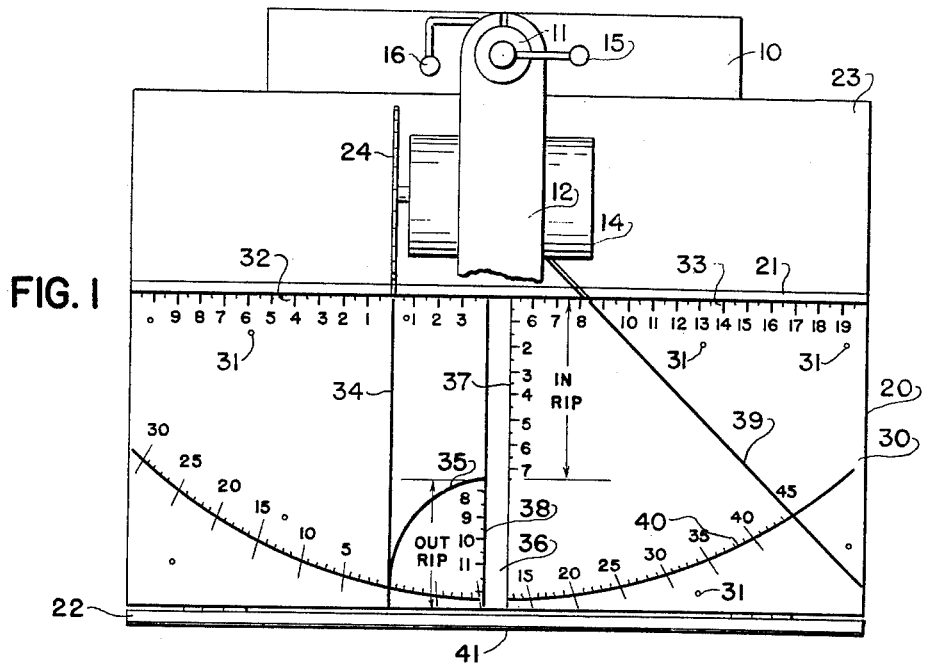
FIG. 1 is a top view of a radial arm saw with the front portion of the radial arm broken away to show markings on a saw table according to this invention.

Referring to the drawings in detail, FIGS. 1, 2, 3 and 4 show a radial arm saw which is also known as an over arm saw. The radial arm saw has a metal base 10 from the rear portion of which there extends upward a vertical column 11. An arm 12 extends horizontally from the column 11 and may be rotated about the arm and raised and lowered with or about it by means of the locking and elevating levers 16 and 15. The bottom of arm 12 forms a track on which there is slidably mounted a carriage 17 from which there depends a yoke 13 which holds a motor 14. On saw base 10 in front of column 11 there is secured the forward portion 20 of the saw table. A guide strip 21 is clamped against the rearmost edge of the forward portion 20 of the saw table by the rear portion 23 of the saw table. A drop leaf 22 may be secured by hinges to the front edge of the forward portion 20. When the drop leaf 22 is raised and locked in a horizontal position, it extends the effective working surface of the saw table.

Figure 2:
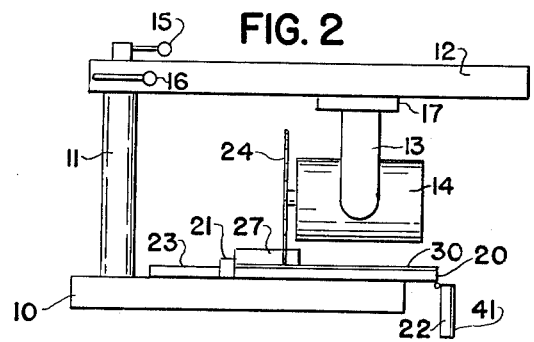
FIG. 2 is a side view of a radial arm saw positioned for in-ripping.

All the aforementioned elements of the radial arm saw are conventional and well known in the art. For ordinary cross cutting, the saw is set as shown in FIG. 1 and a piece to be cut is laid along the guide strip 21. When the motor 14 is turned on, it rotates the saw blade 24 which is mounted on the shaft protruding from the motor 14. By means of a suitable handle mounted on motor 14, motor 14 may be drawn forward as carriage 17 slides along under arm 12 so that blade 24 will cut off the work piece. Mitered cuts are made by setting the arm 12 in a position as shown in FIG. 4. When the arm is locked in such a position, the motor 14 may be drawn forward under arm 12 to cut a work piece at an angle as it is held against the guide strip 21. When the saw is set as shown in FIG. 2 and in FIG. 3, work pieces 27 or 29 may be pushed along the guide strip 21 to rip cut them. When rip cuts are made, the carriage 17 is locked to the arm 12 and cannot slide beneath it. To set the saw from a cross-cut position so that it may be used for rip cutting, the yoke 13 is unlocked from carriage 17 so that it may be rotated 90 degrees relative to it whereupon the yoke 13 is relocked to carriage 17. If the motor 14 is tilted within the yoke 13, bevel cuts may be made. These operations are all standard and are well known in the art.

As shown in the drawings, this invention consists of a thin protective cover 30 which is fixed on top of the forward portion 20 of the saw table. If small nails or brads 31 are used to tack the protective cover on the forward portion 20 of the saw table, these brads 31 must be driven until their heads are flush with the top surface of the protective cover 30 so that they will not snag work pieces being pushed over them. In addition, the brads 31 must be located in the protective cover so that they will not interfere with the more common cuts made with the over arm saw.

Two scales 32 and 33 are formed on the protective cover alongside the guide strip 21. The zero reading on each scale 32 and 33 starts from a line 34 which indicates the path of blade 24 when making standard cross cuts. As soon as the protective cover 30 is secured to the saw table, the arm 12 will be lowered so that the blade 24 may make a slight cut into the protective cover along the cross cut line 34. Cutting into the protective cover 30 is necessary so that the complete penetration of a work piece by blade 24 is assured. The scales 32 and 33 may then be used to indicate the amount of material which is being removed from the end of a work piece during a cross cut operation.

Figure 3:
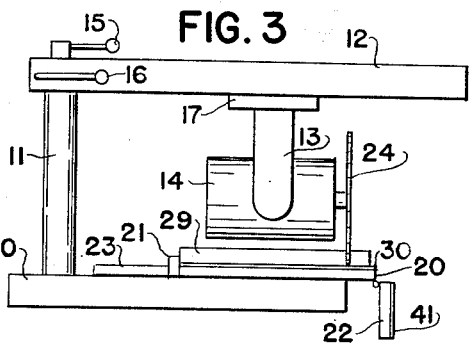
FIG. 3 is a side view of a radial arm saw positioned for out-ripping.
Figure 4:
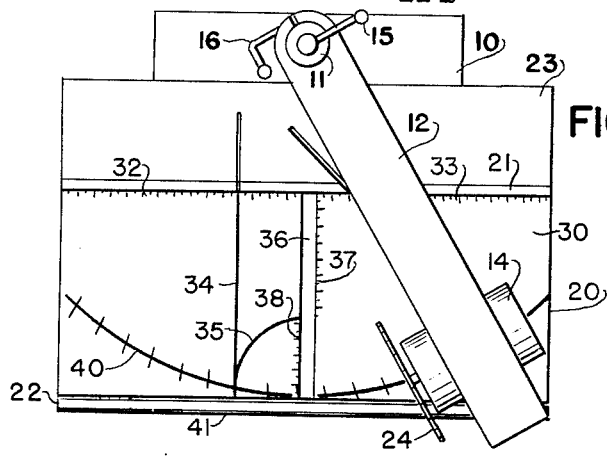
FIG. 4 is a top view of a radial arm saw positioned for a miter cut.

When the motor 14 is drawn outward under arm 12, it may be rotated into a rip position as shown in FIG. 2 or FIG. 3. Since the blade 24 usually extends into the slight cut made along line 34, the motor 14 may be run to turn the saw blade 24 and make a cut along line 35 as the yoke 13 is rotated into the rip position. Once a cut is made along line 35, the yoke 13 may be rotated relative to carriage 17 to position saw blade 24 in a rip position as shown in FIG. 2 without running motor 14. With the motor 14 and blade 24 in a rip position, the motor 14 is pushed in and out along arm 12 so that the blade will cut the rip channel 36 in the protective cover 30. These procedures are well known in radial arm saw operation.

On conventional over arm saws there is usually fixed to the side of arm 12 a rip scale so that the width of a rip cut may be read on the rip scale by a pointer which is fixed to carriage 17. The pointer indicates the width of the rip cut on the rip scale. A rip scale mounted on arm 12 is not needed when my protective cover 30 is used with a radial arm saw. Extending along one side of rip channel 36 is the in-rip scale 37. This scale extends forward from the guide strip 21 a distance substantially equal to the length of motor 14. Even with the end of the in-rip scale 37 on the other side of rip channel 36 there starts the out-rip scale which continues to the forward edge of the protective cover 30. Therefore, as shown in FIG. 1, if an operator of a radial arm saw to which there is attached my protective cover desires to make a rip cut, he looks along scales 37 and 38 until he locates width of cut that he wishes to make. If the width of cut that he wishes to make falls on scale 37, the operator will immediately see that he should set the motor 14 and blade 24 in the in-rip position shown in FIG. 2. Likewise, should the desired width of cut fall on scale 38, the operator will immediately see that motor 14 and blade 24 should be placed in the out-rip position shown in FIG. 3.

These two scales 37 and 38 disposed on opposite sides of the rip channel 36 give rise to two very important safety features. Although the cut which is shown being made on work piece 27 in FIG. 2 could just as easily be made from an out-rip position by sliding carriage 17 inward towards column 11 after placing blade 24 in an out-rip position, the hand of an operator urging work piece 27 along guide strip 21 could not pass beneath motor 14. Even if an operator could urge the work piece 27 beneath motor 14 by thrusting his fingers under motor 14, this is a very dangerous practice as he cannot then watch his own movements. But if the cut is made in the in-rip position as shown in FIG. 2, the motor 14 is disposed away from column 11 and the operator may then move work piece 27 past blade 24 without any interference from motor 14.

However, as shown in FIG. 3, when the width of cut is sufficient so that in the out-rip position an operator's hand may pass behind motor 14, rip cuts in a work piece 29 may safely be made in the out-rip position. The out-rip position secures the motor 14 more rigidly as carriage 17 is then secured to arm 12 closer to column 11. As seen in FIG. 1, the top of blade 24 would be moving towards the front of the radial arm saw. Thus when the saw was set in an in-rip position, work should be fed to the saw from the right-hand side of the radial arm saw along guide strip 21. This allows the work to be forced into the saw teeth and the rotating blade 24 will not draw the work into it to jam the saw. For a similar reason when the motor 14 is rotated through 180 degrees into the out-rip position, the work piece must be fed into the saw from the left-hand side as shown in FIG. 1. Since the in-rip scale is on the right-hand side of rip channel 36, the operator will immediately know that the work piece should be fed from the right-hand side of the radial arm saw when it is in the in-rip position. When out-ripping and using scale 38 which is disposed on the left-hand side of the rip channel 36, the operator will immediately know that he must feed the work piece from the left-hand side of the radial arm saw.

When mitering cuts are made with a conventional over arm saw, a small mitering gauge is usually mounted on column 11 so that a pointer moving with arm 12 will indicate the number of degrees of the miter cut. A detent action is usually provided to lock arm 12 in the much used 45 degree miter cut position. This 45 degree miter cut is indicated on my protective cover by the line 39. However, on a conventional over arm saw when making other than a 45 degree miter cut, it is hard to set the arm 12 within two or three degrees because the miter gauge mounted on column 11 must necessarily be very small and thus it is hard to read. According to this invention, I provide a large miter scale 40 which is inscribed on my protective cover 30 so that, when it is desired to make a miter cut of any desired angle, the saw blade 24 need only be positioned above the appropriate degree marking on my miter scale 40. As shown in FIG. 4, arm 12 is positioned to make a 30 degree miter cut. Not only is my miter scale far superior in accuracy to the conventional small miter scale mounted on or about column 11, but it is much less expensive to provide a single protective cover 30 with an over arm saw and dispense with both the conventional miter scale and the conventional rip scale.

If a drop leaf extension 22 is provided with the work table, a drop leaf protective cover 41 should be provided of the same thickness as the protective cover 30 to be fastened to drop leaf 22 so that, when drop leaf 22 is raised to a horizontal position, the top surfaces of protective cover 30 and drop leaf cover 41 will be even.

This invention may be made as a protective cover which may be sold for existing radial arm saws so that they may be more accurately and safely used. This invention may also be practiced by applying my scales directly to the top surface of the saw table of a radial arm saw so that the saw may be made and sold without the conventional rip and miter scales.

While I have disclosed my invention in the best form known to me, it will nevertheless be understood that this is purely exemplary and that modifications may be made without departing from the spirit of the invention except as it may be more limited in the appended claims.

I claim:

1. In a radial arm saw having a radial arm, a motor slidably and rotatably secured beneath said arm, a shaft extending longitudinally from one end of said motor, a rotary saw blade mounted on said shaft, a work table, and a guide strip secured by the rear edge of said work table; said work table having an area in which a rip channel may be cut, an in-rip scale formed adjacent one side of said area in which a rip channel may be cut, said in-rip scale being at least the length of said motor and extending forward from said guide strip, and an out-rip scale adjacent to the other side of said area in which a rip channel may be cut, said out-rip scale extending outward beyond said in-rip scale.

2. In combination with a radial arm saw having a radial arm, a motor slidably and rotatably secured beneath said arm, a shaft extending longitudinally from one end of said motor, a rotary saw blade mounted on said shaft, a work table, and a guide strip secured by the rear edge of said work table; a protective cover for said work table, said protective cover having an area in which work piece may be cut, an in-rip scale formed adjacent to the side of said area from which a work piece should be fed in the in-rip position, said in-rip scale being at least the length of said motor and extending forward from said guide strip, and an out-rip scale adjacent to the other side of said area in which a rip channel may be cut, said out-rip scale starting at the termination of said in-rip scale and extending outward beyond said in-rip scale.

3. In combination with a radial arm saw having a radial arm, a motor slidably and rotatably secured beneath said arm, a shaft extending longitudinally from one end of said motor, a rotary saw blade mounted on said shaft, a work table, and a guide strip secured by the rear edge of said work table; a protective cover for said work table, said protective cover having an area in which a rip channel may be cut, a cross cut line extending forward from said guide strip, two cut off scales formed on said protective cover on either side of said cross cut line adjacent to said guide strip, a miter scale extending from at least one side of said cross cut line, said miter scale indicating degrees of cut off angle as said blade is positioned over said miter scale, an in-rip scale formed adjacent to the side of said area from which a work piece should be fed in the in-rip position, said in-rip scale being at least the length of said motor and extending forward from said guide strip, and an out-rip scale adjacent to the other side of said area in which a rip channel may be cut, said out-rip scale starting at the termination of said in-rip scale and extending outward beyond said in-rip scale.

References Cited in the file of this patent

UNITED STATES PATENTS

| | | |
|---|---|---|
| 663,645 | Strait | Dec. 11, 1900 |
| 913,078 | Weber | Feb. 23, 1909 |
| 1,646,589 | Meek | Oct. 25, 1927 |
| 1,756,121 | Hedgpeth | Apr. 29, 1930 |
| 2,396,961 | Meredith | Mar. 19, 1946 |
| 2,422,843 | Mooradian | June 24, 1947 |
| 2,559,283 | Dick | July 3, 1951 |
| 2,656,860 | Thayer | Oct. 27, 1953 |
| 2,722,952 | Snyder | Nov. 8, 1955 |
| 2,803,271 | Shaw | Aug. 20, 1957 |
| 2,818,093 | Thornburg | Dec. 31, 1957 |